(12) United States Patent
Al-Stouhi

(10) Patent No.: US 10,225,717 B2
(45) Date of Patent: Mar. 5, 2019

(54) SYSTEMS AND METHODS FOR CONTROLLING DSRC COMMUNICATIONS

(71) Applicant: Honda Motor Co., Ltd., Tokyo (JP)

(72) Inventor: Samir Al-Stouhi, Dearborn, MI (US)

(73) Assignee: Honda Motor Co., Ltd., Tokyo (JP)

( * ) Notice: Subject to any disclaimer, the term of this patent is extended or adjusted under 35 U.S.C. 154(b) by 25 days.

(21) Appl. No.: 15/423,970

(22) Filed: Feb. 3, 2017

(65) Prior Publication Data

US 2018/0227698 A1 Aug. 9, 2018

(51) Int. Cl.
*H04W 4/00* (2018.01)
*H04W 4/80* (2018.01)
*G08G 1/09* (2006.01)
*G08G 1/0967* (2006.01)
*H04W 4/02* (2018.01)
*H04W 28/02* (2009.01)
*H04W 4/40* (2018.01)

(52) U.S. Cl.
CPC ............. *H04W 4/80* (2018.02); *G08G 1/094* (2013.01); *G08G 1/096791* (2013.01); *H04W 4/023* (2013.01); *H04W 4/40* (2018.02); *H04W 28/0231* (2013.01)

(58) Field of Classification Search
CPC ..... H04W 4/008; H04W 4/023; H04W 4/046; H04W 4/02; H04W 4/06; H04W 4/021; H04L 67/26; H04L 67/18; G01C 21/3629; G08G 1/0965; G08G 1/161; G08G 1/0967

See application file for complete search history.

(56) References Cited

U.S. PATENT DOCUMENTS

| | | |
|---|---|---|
| 6,516,285 B1 | 2/2003 | Hori et al. |
| 6,985,089 B2 | 1/2006 | Liu et al. |
| 7,164,924 B2 | 1/2007 | Ueda et al. |
| 7,986,247 B2 | 7/2011 | Bauer et al. |
| 8,330,620 B2 | 12/2012 | Staehlin et al. |
| 8,868,141 B2 | 10/2014 | Subramanian et al. |
| 8,890,712 B2 | 11/2014 | Mochizuki et al. |
| 9,092,913 B2 | 7/2015 | Guener et al. |

(Continued)

OTHER PUBLICATIONS

Wu, Xinzhou et al., "Cars Talk to Phones: A DSRC Based Vehicle-Pedestrian Safety System", 2014 IEEE 80th Vehicular Technology Conference; Sep. 14-17, 2014; Vancouver, Canada, 7 pp.

*Primary Examiner* — Thanh C Le
(74) *Attorney, Agent, or Firm* — Armstrong Teasdale LLP

(57) ABSTRACT

A DSRC controller used for controlling a dedicated short-range communication (DSRC) device is provided. The DSRC controller includes a processor communicatively coupled to a memory device. The processor is programmed to store a communication profile of the DSRC device. The communication profile includes rules for transmitting and receiving communications by the DSRC device. The processor is also programmed to receive DSRC zone information describing a DSRC zone, determine a current location of the DSRC device, compare the current location to the DSRC zone information, determine whether the DSRC device is located within a DSRC zone based on the comparison, and if the determination is that the DSRC device is located within the DSRC zone, update the communication profile based on the DSRC zone information.

19 Claims, 8 Drawing Sheets

(56) References Cited

U.S. PATENT DOCUMENTS

| | | | |
|---|---|---|---|
| 2010/0211310 A1* | 8/2010 | Hotta | G01C 21/3629 |
| | | | 701/533 |
| 2012/0270558 A1 | 10/2012 | Busch et al. | |
| 2017/0124775 A1* | 5/2017 | Breed | H04W 4/046 |
| 2017/0127237 A1* | 5/2017 | Hayee | H04W 4/023 |

* cited by examiner ated devices. With the increase in communications using vehicle to vehicle (V2V) and vehicle to infrastructure (V2I) communications, the number of DSRC enabled devices is growing every day.

SYSTEMS AND METHODS FOR CONTROLLING DSRC COMMUNICATIONS

BACKGROUND

The field of the disclosure relates generally to controlling dedicated short-range communications (DSRC) equipment, and more specifically to methods and systems for use in controlling a communication profile of DSRC equipment based on the current geographic location of the DSRC equipment.

Some vehicles and navigation systems include Dedicated Short-Range Communication (DSRC) capabilities. DSRC permits the transmission of communications for navigation, threat detection, and safety messages between DSRC enabled devices. With the increase in communications using vehicle to vehicle (V2V) and vehicle to infrastructure (V2I) communications, the number of DSRC enabled devices is growing every day.

Communications channel bandwidth may become limited as more devices utilize a specific communications channel, such as DSRC. The reduction in channel bandwidth may create a situation where emergency or local agencies communications are compromised during an emergency or similar event where a large number of devices are transmitting within a limited geographical area, thereby congesting the channel and preventing or interfering with the use of the channel by emergency or local agencies. In certain locations, transmitting DSRC messages to all users results in unnecessary redundant messaging. Thus, it is desirable to maximize channel bandwidth in certain situations, such as in an emergency or similar events, to prevent critical communications from being lost or delayed.

BRIEF DESCRIPTION

In one aspect, a DSRC controller used for controlling a dedicated short-range communication (DSRC) device is provided. The DSRC controller includes a processor communicatively coupled to a memory device. The processor is programmed to store a communication profile of the DSRC device. The communication profile includes rules for transmitting and receiving communications by the DSRC device. The processor is also programmed to receive DSRC zone information describing a DSRC zone, determine a current location of the DSRC device, compare the current location to the DSRC zone information, determine whether the DSRC device is located within a DSRC zone based on the comparison, and if the determination is that the DSRC device is located within the DSRC zone, update the communication profile based on the DSRC zone information.

In another aspect, a computer-based method for controlling a dedicated short-range communications (DSRC) device is provided. The method is implemented using a DSRC controller in communication with a memory. The method includes storing, in the memory a communication profile of the DSRC device, wherein the communication profile includes rules for transmitting and receiving communications by the DSRC device. The method also includes receiving, at the DSRC controller, DSRC zone information describing a DSRC zone, determining, by the DSRC controller, a current location of the DSRC device, comparing, by the DSRC controller, the current location to the DSRC zone information, determining, by the DSRC controller, whether the DSRC device is located within a DSRC zone based on the comparison, and if the determination is that the DSRC device is located within the DSRC zone, update the communication profile based on the DSRC zone information.

In yet another aspect, a non-transitory computer-readable storage device having processor-executable instructions embodied thereon, for controlling a dedicated short-range communications (DSRC) device is provided. When executed by a DSRC controller communicatively coupled to a memory, the processor-executable instructions cause the DSRC controller to store a communication profile of the DSRC device. The communication profile includes rules for transmitting and receiving communications by the DSRC device. The processor-executable instructions also cause the DSRC controller to receive DSRC zone information describing a DSRC zone, determine a current location of the DSRC device, compare the current location to the DSRC zone information, determine whether the DSRC device is located within a DSRC zone based on the comparison, and if the determination is the DSRC device is located within the DSRC zone, update the communication profile based on the DSRC zone information.

BRIEF DESCRIPTION OF THE DRAWINGS

FIGS. 1A-6 show example embodiments of the methods and systems described herein.

FIGS. 1A-1C illustrate example views of geographic maps including DSRC zones.

FIG. 2 is a simplified block diagram of an example DSRC system for use in controlling a communication profile of DSRC device based on the DSRC geographic map shown in FIG. 1C.

FIG. 3 illustrates an example configuration of a client system shown in FIG. 2, in accordance with one embodiment of the present disclosure.

FIG. 4 illustrates an example configuration of a server system shown in FIG. 2, in accordance with one embodiment of the present disclosure.

FIG. 5 is a flow chart of a process for controlling a communication profile of a DSRC device based on the current geographic location of the DSRC device using the DSRC communication controller shown in FIG. 2.

FIG. 6 is a diagram of components of one or more example computing devices that may be used in the DSRC system shown in FIG. 2.

DETAILED DESCRIPTION

Figure 1A:
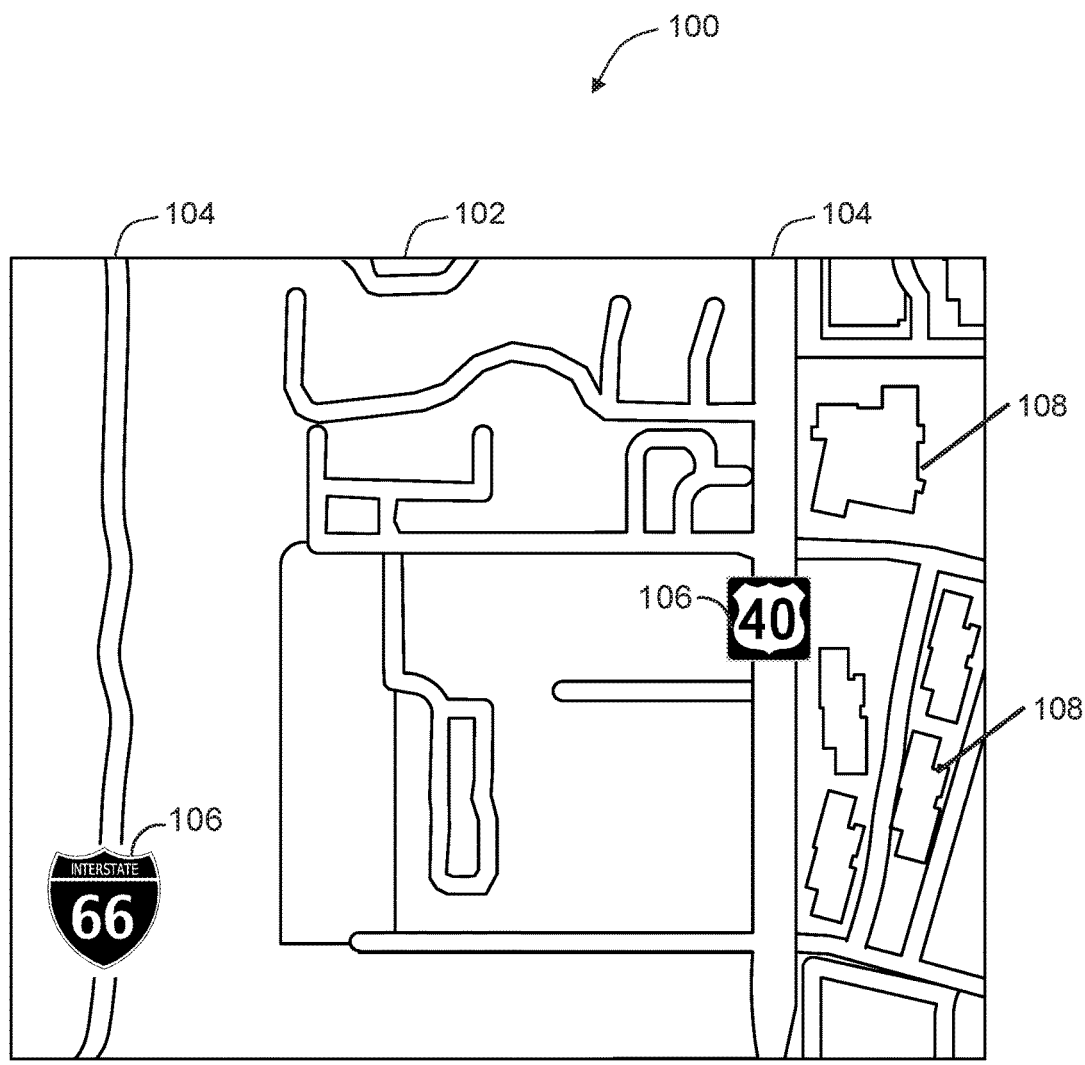

The following detailed description illustrates exemplary embodiments by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. These system and methods are for use in controlling a communication profile of DSRC equipment based on the current geographic location of the DSRC equipment.

The methods and system described herein may be implemented using computer programming or engineering techniques including computer software, firmware, hardware, or any combination or subset. As described above, at least one technical problem with known systems is a need to dynamically change the communication properties of a DSRC device based on the devices location. The system and methods described herein address that technical problem. The technical effect of the systems and processes described herein is achieved by performing at least one of the following steps: (a) storing a communication profile of a DSRC device, where the communication profile includes rules for transmitting and receiving communications by the DSRC device; (b) receiving DSRC zone information describing a DSRC zone, where the DSRC zone information includes at least a location and a type for the DSRC zone; (c) determining a current location of the DSRC device based on at least one of location information from a global positioning system (GPS) device and location information from a Wi-Fi positioning system; (d) comparing the current location to the DSRC zone information; (e) determining whether the DSRC device is located within a DSRC zone based on the comparison; (f) determining if the current location is within a predetermined distance from the DSRC zone based on the DSRC zone information; and (g) if the determination is that the DSRC device is located within the DSRC zone, updating the communication profile based on the DSRC zone information to at least one of prevent the DSRC device from transmitting within the DSRC zone, to activate an information download mode, and to prevent the DSRC device from transmitting one or more types of messages while in the DSRC zone. The resulting technical effect is that DSRC devices are ability to dynamically adjust their communication parameters based on current conditions at their location.

In some embodiments, the technical effect of the systems and processes described herein is achieved by performing at least one of the following steps: (a) determining an updated current location for the DSRC device at a subsequent time; (b) determining that the DSRC device is not located within the DSRC zone based on the updated current location and the DSRC zone information; and (c) updating the communication profile to remove the DRSC zone information.

In some further embodiments, the technical effect of the systems and processes described herein is achieved by performing at least one of the following steps: (a) receiving DSRC zone information describing a DSRC zone, where the DSRC zone information describes a temporary DSRC zone; (b) receiving a message indicating the temporary DSRC zone has ended; and (c) updating the communication profile to remove the DSRC zone information.

In another embodiment, the technical effect of the systems and processes described herein is achieved by performing at least one of the following steps: (a) storing a plurality of map information including a DSRC layer, wherein the DSRC layer includes one or more DSRC zones; (b) adding the received DSRC information to the DSRC layer; and (c) comparing the current location to the DSRC layer to determine whether the current location is within a DSRC zone included in the DSRC layer.

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, the term "DSRC" may refer to dedicated short-range communications. DSRC may be either one-way or two way short to medium range communications. DSRC may allow for very high data transmission for critical communications-based active safety applications. Attributes of DSRC include, but are not limited to, fast network acquisition (immediate establishment of communication and frequent updates), low latency (devices recognize each other and transmit messages to each other in milliseconds without delay), high reliability (working during vehicle mobility at high speeds and is immune to weather conditions), priority is given to safety applications, interoperability (supporting vehicle to vehicle "V2V" and vehicle to infrastructure "V2I" communications), and security and privacy (message authentication and privacy).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Figure 1B:
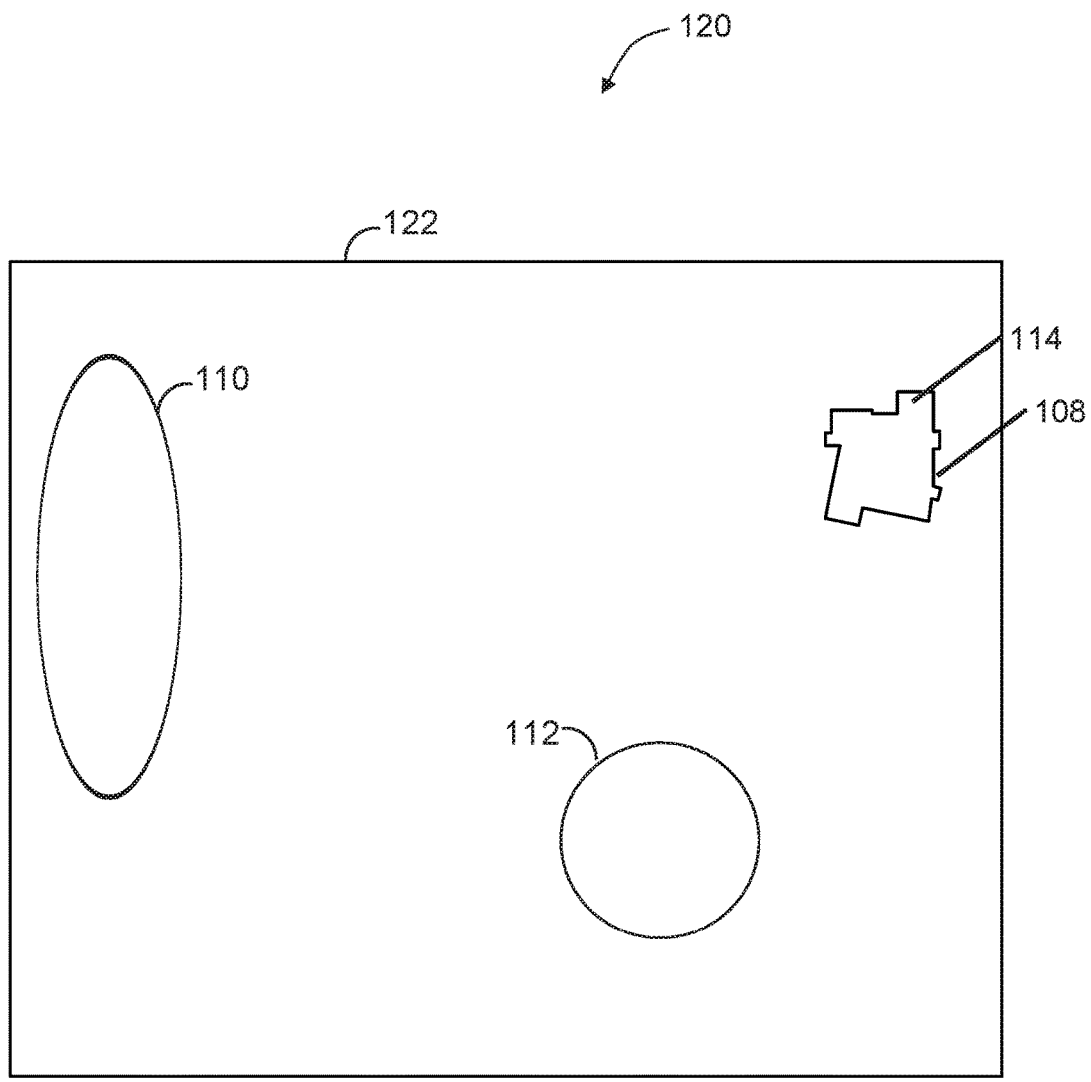
Figure 1C:
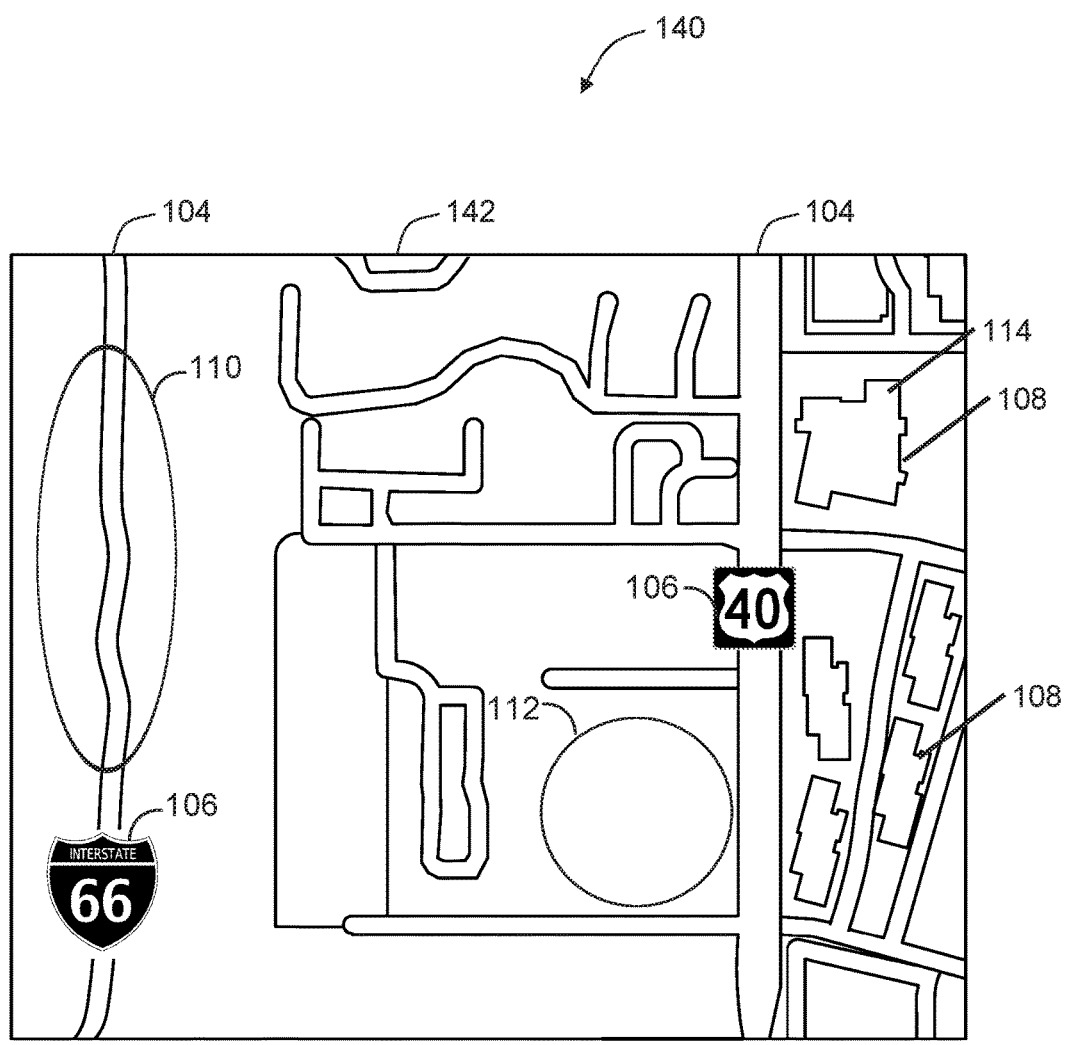

FIGS. 1A-1C illustrate example views 100, 120, and 140 of geographic maps 102, 122, and 142 including DSRC zones 110, 112, and 114.

FIG. 1A illustrates a view 100 of a geographic map 102. Map 102 includes roads 104, road labels 106, and buildings 108.

FIG. 1B illustrates a view 120 of a DSRC map layer 122. DSRC map layer 122 includes a plurality of DSRC zones 110 and 112. DSRC map layer 122 also includes a building 108 that is a DSRC zone 114. As explained in detail below, DSRC zones 110, 112, and 114 represent areas where DSRC messaging is modified from normal operation. In some DSRC zones 110, 112, and 114, DSRC messaging is limited by message type or frequency. In other DSRC zones 110, 112, and 114, transmission of DSRC messages is prevented. In some of these zones, only specific devices may transmit. In other zones, the DSRC messages are in a specific format, such as large messages that provide significant amounts of data. DSRC operation may be modified in other manners as well.

In the example embodiment, DSRC zone 110 is a temporary zone, such as a zone that is generated due to an accident or other emergency condition, where the condition may affect the operation of DSRC devices. In the example embodiment, DSRC zone 112 is a permanent DSRC zone, such as a zone that is based around a specific location. For example, DSRC 112 may be based around a vehicle dealership which indicates special conditions for DSRC messaging in the area around the dealership, such as an information download mode. In the example embodiment, DSRC zone 114 is a building 108 based zone. In this embodiment, building 108 may be a stadium or a hospital and indicate that DSRC devices inside of building 108 are not to transmit. In other embodiments, each DSRC zone 110, 112, and 114 has other rules for DSRC messaging while a DSRC device is within the respective zone.

FIG. 1C illustrates a view 140 of a DSRC geographic map 142 that combines map 102 with DSRC map layer 122. In some embodiments, DSRC map 142 is displayed to a user. In other embodiments, DSRC map 142 is used internally for controlling communications of a DSRC device.

Figure 2:
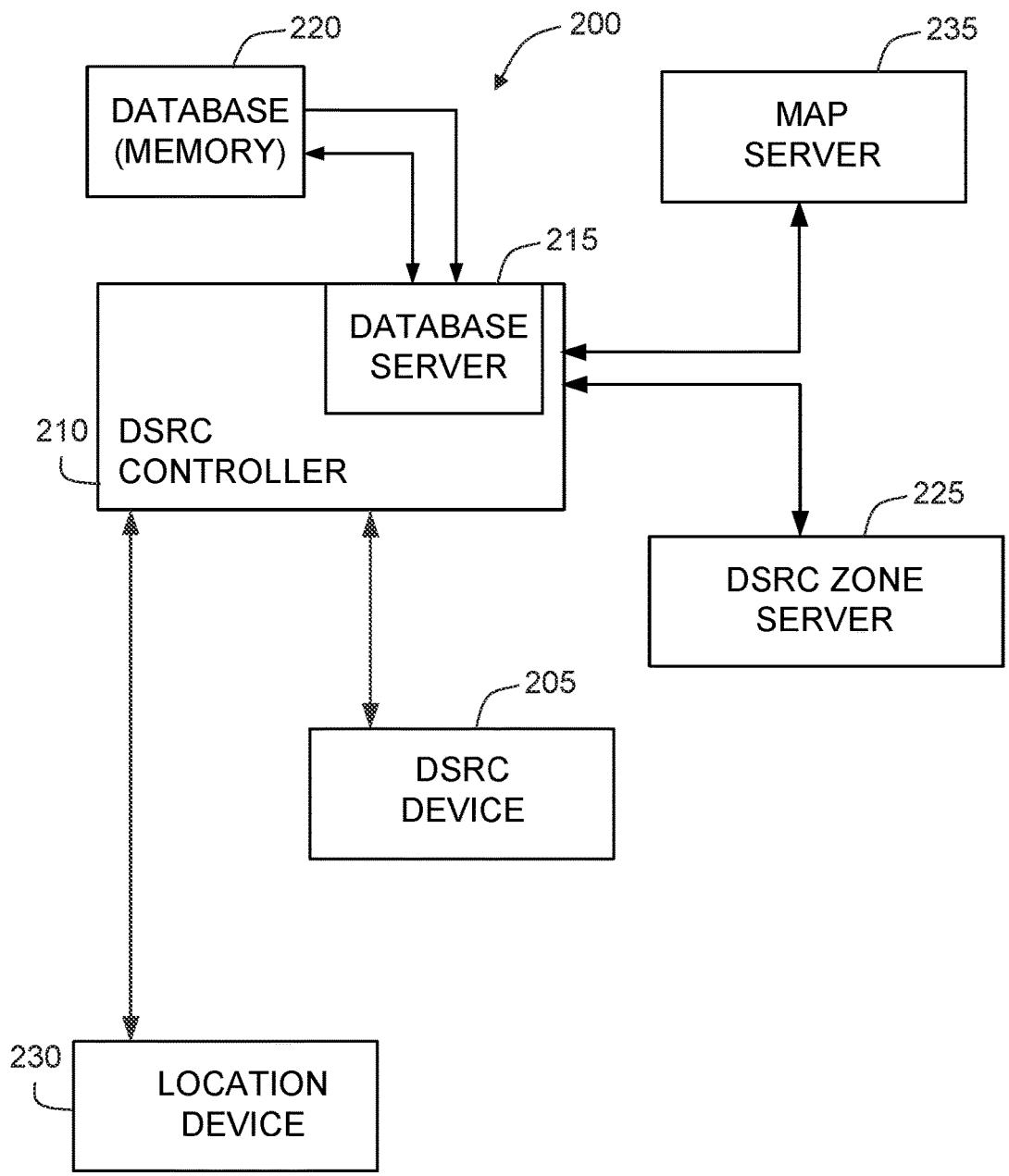

FIG. 2 is a simplified block diagram of an example DSRC system 200 for use in controlling a communication profile of a DSRC device 205 based on the DSRC geographic map 142 shown in FIG. 1C. In the example embodiment, DSRC system 200 may be used for controlling communications of DSRC devices 205 based on the geographic location of the DSRC device 205. In addition, DSRC system 200 includes a DSRC controller 210 that coordinates and controls the communication profile of DSRC device 205. As described below in more detail, DSRC controller 210 stores a communication profile of DSRC device 205, where the communication profile includes rules for transmitting and receiving communications by DSRC device 205, receives DSRC zone information describing a DSRC zone 110 (shown in FIG. 1B), determines a current location of DSRC device 205, compares the current location to the DSRC zone information, determines whether DSRC device 205 is located within DSRC zone 110 based on the comparison, and if the determination is that DSRC device 205 is located within DSRC zone 110, updates the communication profile of DSRC device 205 based on the DSRC zone information.

In the example embodiment, DSRC device 205 is any device capable of transmitting and/or receiving messages using the dedicated short-range communication protocol. For example, DSRC device 205 may be included in a vehicle (not shown), may be part of a cell phone or other mobile electronic device, may be part of a non-portable infrastructure device, such as a part of a toll booth, and may be part of a portable infrastructure device, such as a portable traffic conditions sign. In the example embodiment, DSRC device 205 is also capable of communicating with DSRC controller 210 through at least one of many interfaces, including, but not limited to, a local area network (LAN), a wide area network (WAN), or an integrated services digital network (ISDN), a dial-up-connection, a digital subscriber line (DSL), a cellular phone connection, a Bluetooth connection, a Wi-Fi connection, a cable modem, a direct wired connection, or any other communication connection that allows communication between DSRC device 205 and DSRC controller 210. In the example embodiment, the communications between DSRC device 205 and DSRC controller 210 do not use the DSRC protocol. In the example embodiment, DSRC device 205 includes a communication profile that dictates how and when DSRC device 205 communicates using the DSRC protocol.

In the example embodiment, DSRC controller 210 is any device capable of controlling the communication profile of DSRC device 205. More specifically, DSRC controller 210 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. DSRC controller 210 may be, but is not limited to, a personal digital assistant (PDA), a cellular phone, a desktop computer, a laptop, a server system, a smartphone, a tablet, a phablet, wearable electronics, smart watch, a vehicle computer device, or other web-based connectable equipment or mobile devices that allow it to function as described herein.

In the example embodiment, map server 235 is one or more computers that include a web browser or a software application to enable transmission of map information, such as map 102 (shown in FIG. 1A), to DSRC controller 210 using the Internet. More specifically, map server 235 is communicatively coupled to the Internet through many interfaces including, but not limited to, at least one of a network, such as a local area network (LAN), a wide area network (WAN), or an integrated services digital network (ISDN), a dial-up-connection, a digital subscriber line (DSL), a cellular phone connection, and a cable modem. In the example embodiment, DSRC controller 210 accesses map server 235 for maps 102 of the location of DSRC device 205. In some embodiments, map server 235 is in communication with a location device 230 associated with DSRC controller 210. In these embodiments, map server 235 communicates maps 102 to DSRC controller 210 through location device 230.

In the example embodiment, DSRC zone server 225 is one or more computers that include a web browser or a software application to enable transmission of DSRC zone information to DSRC controller 210 using the Internet. More specifically, DSRC zone server 225 is communicatively coupled to the Internet through many interfaces including, but not limited to, at least one of a network, such as a local area network (LAN), a wide area network (WAN), or an integrated services digital network (ISDN), a dial-up-connection, a digital subscriber line (DSL), a cellular phone connection, and a cable modem. In the example embodiment, DSRC controller 210 accesses DSRC zone server 225 for DSRC zone information about DSRC zones, such as zones 110, 112, and 114 (shown in FIG. 1B). In some embodiments, DSRC zone server 225 transmits DSRC map layer 122 (shown in FIG. 1B) to DSRC controller 210. In other embodiments, DSRC controller 210 assembles DSRC map layer 122 from DSRC zone information received from DSRC zone server 225.

A database server 215 is communicatively coupled to a database 220 that stores data. In one embodiment, database 220 includes maps 102, DSRC map layers 122, DSRC zone information, and communication profiles. In the example embodiment, database 220 is stored remotely from DSRC controller 210. In some embodiments, database 220 is decentralized. In the example embodiment, a person can access database 220 via a user computer devices (not shown) by logging onto DSRC controller 210 or directly through DSRC controller 210, as described herein.

In the example embodiment, DSRC controller 210 is in communication with one or more location devices 230. In the example embodiment, location devices 230 are associated with DSRC device 205 and are configured to determine the current location of DSRC device 205. Examples of location devices 230 include, but are not limited to, Global Positioning Systems (GPS), Wi-Fi based location detection systems, and cellular based location detection systems. Location device 230 is configured to transmit the current location of DSRC device 205 to DSRC controller 210. In the example embodiment, location device 230 is positioned at the same location as DSRC device 205. In other embodiments, location device 230 is remote from DSRC device 205 and it able to remotely determine DSRC device's location. In the example embodiment, location device 230 is also capable of communicating with DSRC controller 210 through at least one of many interfaces, including, but not limited to, a local area network (LAN), a wide area network (WAN), or an integrated services digital network (ISDN), a dial-up-connection, a digital subscriber line (DSL), a cellular phone connection, a Bluetooth connection, a Wi-Fi connection, a cable modem, a direct wired connection, or any other communication connection that allows communication between location device 230 and DSRC controller 210. In some embodiments, location device 230 is integrated into a vehicle, a cell phone, or other mobile device that also includes DSRC device 205. In the example embodiment, the communication between location device 230 and DSRC controller 210 does not use the DSRC protocol. In the example embodiment, location device 230 provides an updated location of DSRC device 205 to DSRC controller 210 in real-time.

Figure 3:
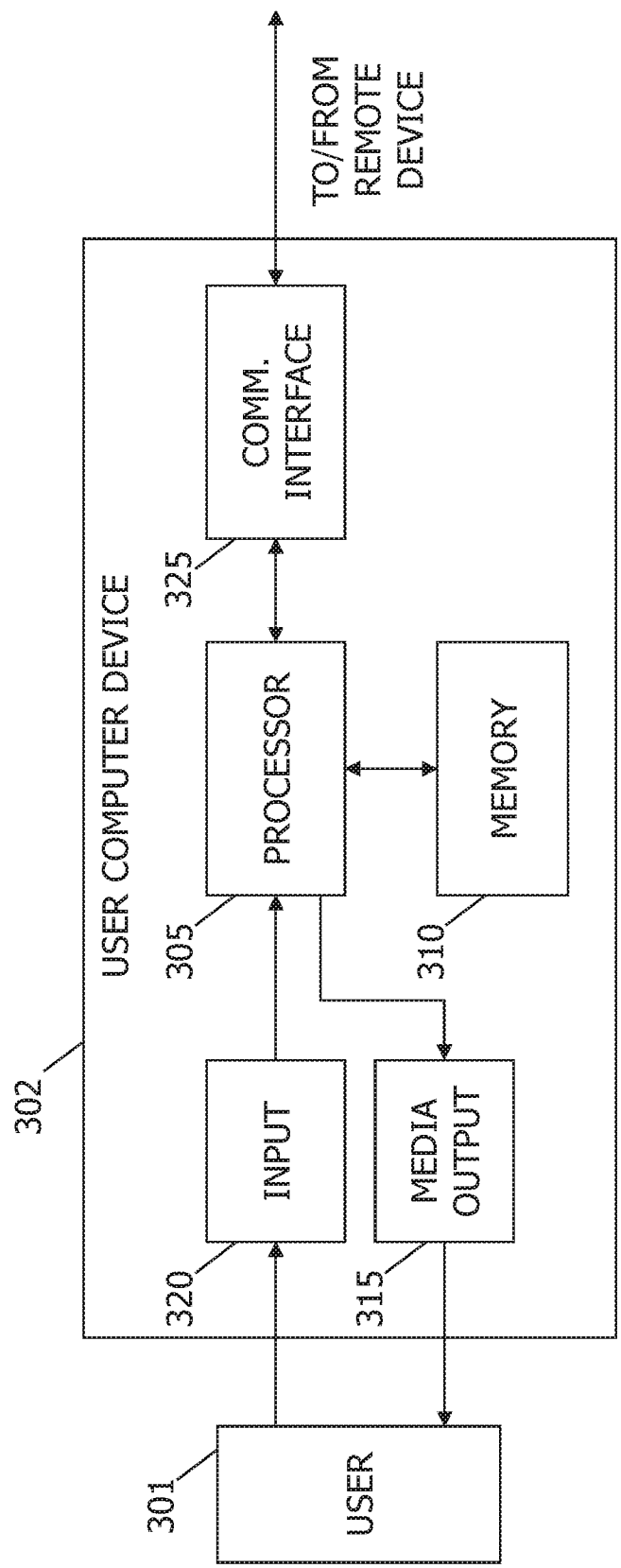

FIG. 3 illustrates an exemplary configuration of a client system shown in FIG. 2, in accordance with one embodiment of the present disclosure. User computer device 302 is operated by a user 301. User computer device 302 may include, but is not limited to, DSRC device 205 and location device 230 (both shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer-readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, a map interface for displaying a map 102 (shown in FIG. 1A) to user 301. In some embodiments, user computer device 302 includes an input device 320 for receiving input from user 301. User 301 may use input device 320 to, without limitation, select, control, and/or enter a location to view. Input device 320 may include, for example, a keyboard, a pointing device, a mouse, a stylus, a touch sensitive panel (e.g., a touch pad or a touchscreen), a gyroscope, an accelerometer, a position detector, a biometric input device, and/or an audio input device. A single component such as a touchscreen may function as both an output device of media output component 315 and input device 320.

User computer device 302 may also include a communication interface 325, communicatively coupled to a remote device such as DSRC controller 210 and map server 235 (both shown in FIG. 2). Communication interface 325 may include, for example, a wired or wireless network adapter and/or a wireless data transceiver for use with a mobile telecommunications network.

Stored in memory area 310 are, for example, computer-readable instructions for providing a user interface to user 301 via media output component 315 and, optionally, receiving and processing input from input device 320. The user interface may include, among other possibilities, a web browser and/or a client application. A client application enables user 301 to interact with, for example, DSRC controller 210. For example, instructions may be stored by a cloud service and the output of the execution of the instructions sent to the media output component 315.

Figure 4:
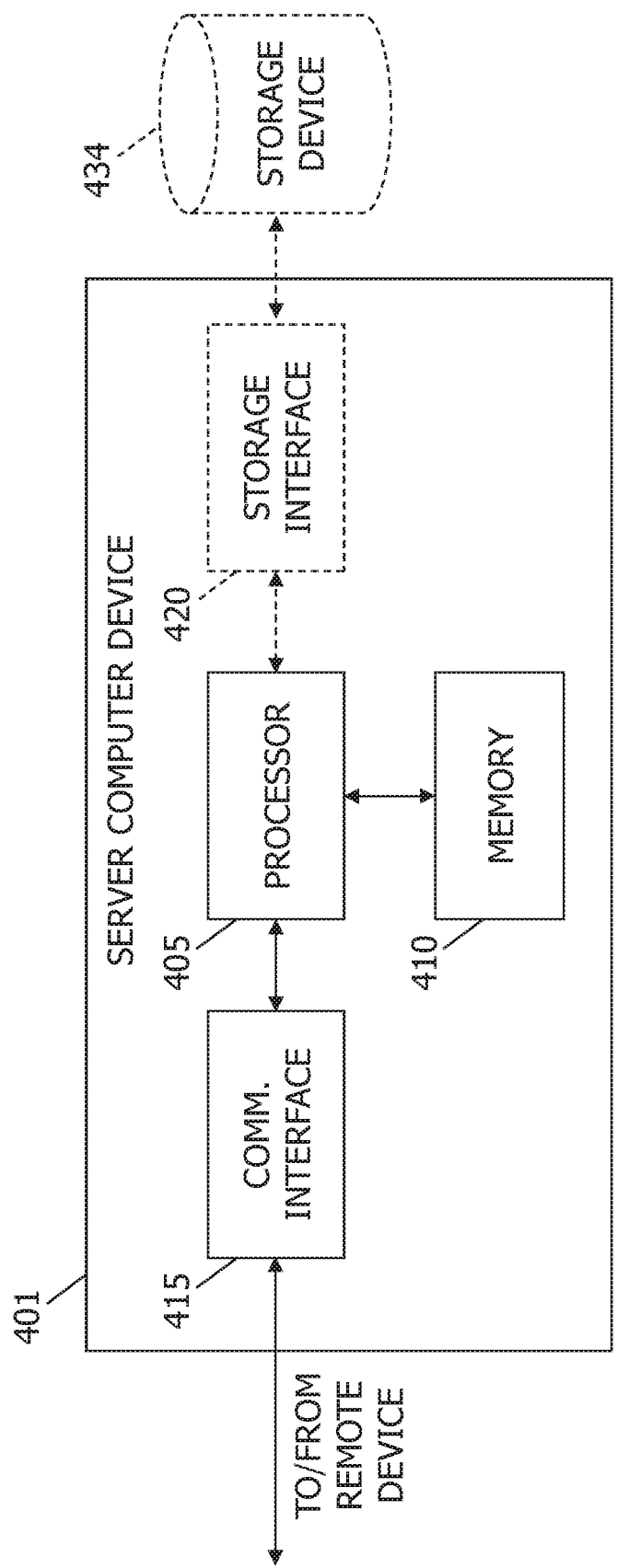

FIG. 4 illustrates an exemplary configuration of a server system shown in FIG. 2, in accordance with one embodiment of the present disclosure. Server computer device 401 may include, but is not limited to, DSRC controller 210, database server 215, map server 235, and DSRC zone server 225 (all shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, DSRC controller 210, database server 215, map server 235, DSRC zone server 225, DSRC device 205 and location device 230 (both shown in FIG. 2). For example, communication interface 415 may receive requests from DSRC controller 210.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 executes computer-executable instructions for implementing aspects of the disclosure. In some embodiments, processor 405 is transformed into a special purpose microprocessor by executing computer-executable instructions or by otherwise being programmed. For example, processor 405 is programmed with the instructions such as are illustrated in FIG. 5.

Figure 5:
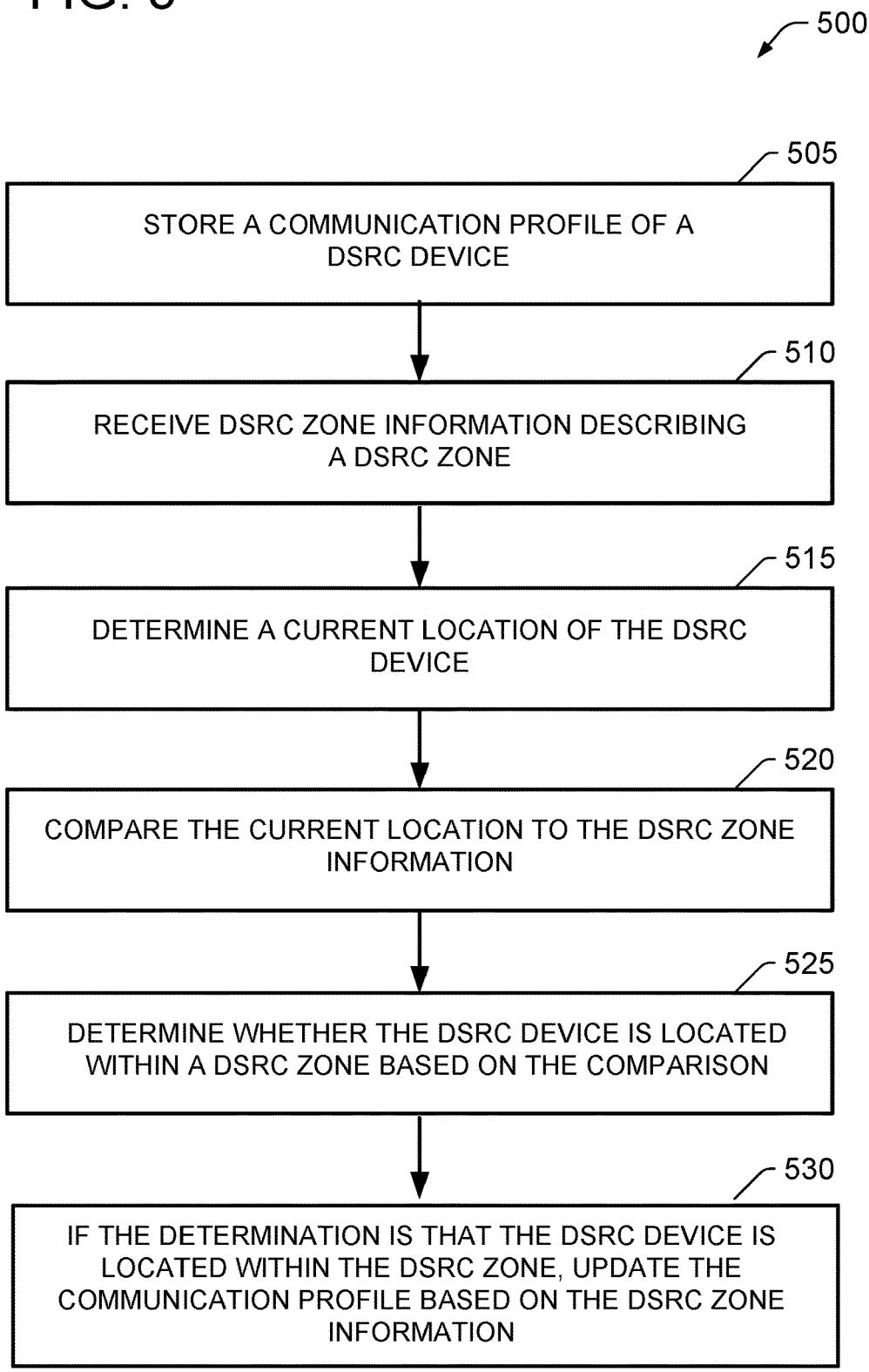

FIG. 5 is a flow chart of a process 500 for controlling a communication profile of DSRC device 205 (shown in FIG. 2) based on the current geographic location of DSRC device 205 using DSRC system 200 (shown in FIG. 2). In the example embodiment, process 500 is performed by DSRC controller 210 (shown in FIG. 2).

In the example embodiment, DSRC controller 210 stores 505 a communication profile of DSRC device 205. The communication profile includes rules for transmitting and receiving communications by DSRC device 205. In some embodiments, a copy of the communication profile is stored locally on DSRC device 205, while a matching copy is stored by DSRC controller 210, such as in database 220 (shown in FIG. 2). In other embodiments, DSRC controller 210 stores the communication profile in a location in memory that is accessible by both DSRC controller 210 and DSRC device 205. In these embodiments, DSRC device 205 accesses the locally stored communication profile prior to transmitting and sets its communication parameters based on the communication profile. These parameters may include, but are not limited to, turning transmissions on or off, limiting transmissions to once every certain amount of time, limiting the size and/or types of transmissions, the frequency of transmissions, the power level of transmissions, the format of messages in the transmissions, whether or not received messages are acknowledged, and any other parameter settings that allow DSRC device 205 to function as described herein.

In the example embodiment, DSRC controller 210 receives 510 DSRC zone information describing a DSRC zone, such as DSRC zone 110, 112, or 114 (all shown in FIG. 1B). In the example embodiment, DSRC controller 210 receives 510 the DSRC zone information from DSRC zone server 225. In the example embodiment, DSRC zone information includes at least a location of the DSRC zone and a zone type. The location may be a section of road, such as the section of road 104 (shown in FIG. 1C) encompassed in zone 110. The location may be a point and a radius around the point, such as for zone 112. The location may be an address, such as that of building 108 (shown in FIG. 1A) associated with zone 114. The location may be any other information necessary to describe the location of the DSRC zone. The zone type may be associated with how DSRC device 205 may communication within that DSRC zone. For example, the zone type may indicate that the DSRC zone is a no transmission zone. In some embodiments, the zone information only includes the zone type as a variable and DSRC controller 210 determines the communication parameters based on the variable and a table stored in database 220. In other embodiments, the zone information includes specific information to be included in the communication profile.

In the example embodiment, DSRC controller 210 stores map information including map 102 and DSRC map layer 122. When DSRC controller 210 receives 510 DSRC zone information, DSRC controller 210 updates DSRC map layer 122 based on the zone information. Based on the zone information, DSRC controller 210 may add a DSRC zone, remove a DSRC zone, move a DSRC zone, or otherwise modify a DSRC zone.

In the example embodiment, DSRC controller 210 determines 515 a current location of DSRC device 205. In the example embodiment, DSRC controller 210 receives the currently location of DSRC device 205 from location device 230 (shown in FIG. 2). DSRC controller 210 compares 520 the current location to the DSRC zone information. DSRC controller 210 determines 525 whether the DSRC device is located within a DSRC zone based on the comparison.

In some embodiments, DSRC controller 210 compares the current location to DSRC map layer 122 to determine 525 if the current location is within a DSRC zone included in DSRC map layer 122. In other embodiments, DSRC controller 210 compares the current location to DSRC map 142, where DSRC controller 210 analyzes the relative distance between the current location of DSRC device 205 and the location of the DSRC zones on the DSRC map 142. In these embodiments, DSRC controller 210 may determine that DSRC device 205 is just about to enter DSRC zone 110. In some embodiments, DSRC controller 210 determines that DSRC device 205 is within a predetermined distance from DSRC zone 110 and considers the DSRC device 205 to be within DSRC zone 110.

If the determination is that the DSRC device 205 is located within DSRC zone 110, DSRC controller 210 updates 530 the communication profile based on the DSRC zone information. In some embodiments, DSRC controller 210 updates the communication profile for DSRC device 205 based on the zone information and transmits the updated communication file to DSRC device 205. In other embodiments, DSRC controller 210 stores the communication profile in a location in memory that is accessible by both DSRC controller 210 and DSRC device 205.

Depending on the zone information, DSRC controller 210 updates the communication profile to allow DSRC device 205 to communicate in the manner dictated by the DSRC zone that DSRC device 205 currently is located in. In some cases, the communication profile may prevent DSRC device 205 from transmitting messages, may put DSRC device 205 in a mode that allows it to receive large amounts of data, may allow DSRC device 205 to only transmit messages of one or more specific types, may allow DSRC device 205 to only transmit messages of a certain size or less than a certain size, may allow DSRC device 205 to only transmit messages under certain conditions, or may modify the communication capabilities in any manner desired based on the DSRC zone.

In some further embodiments, the zone type indicates that the DSRC zone is a temporary zone. For example, DSRC zone 110 may be because of an accident that occurred on Interstate 66, as shown in FIG. 1C. DSRC zone 110 may be representative of a massive slowdown or traffic jam, where the DSRC zone 110 is configured to minimize DSRC messages within DSRC zone 110. The zone information may include a timer or an end time for the DSRC zone 110. For example, DSRC zone 110 may be set to expire at a specific time or a specific amount of time after it started. In some still further embodiments, zone information includes a message indicating that DSRC zone 110 has ended or is no longer valid. In these embodiments, DSRC controller 210 removes or deletes DSRC zone 110. If DSRC device 205 was located in the now deleted DSRC zone 110, DSRC controller 210 updates 530 the communication profile of DSRC device 205 based on DSRC device 205 no longer being in DSRC zone 110.

In some embodiments, DSRC controller 210 receives an updated current location for DSRC device 205 at a subsequent time, such as 5 minutes later. DSRC controller 210 determines that DSRC device 205 is not located within DSRC zone 110 based on the updated current location and DSRC zone information. DSRC controller 210 updates 530 the communication profile of DSRC device 205 based on DSRC device 205 no longer being in DSRC zone 110. In the example embodiment, location device 230 provides the updated current location of DSRC device 205 to DSRC controller 210 in real-time.

In some embodiments, more than one DSRC zone (i.e. 110 and 112) may overlap, where DSRC device 205 is located within more than one DSRC zone. In some of these embodiments, DSRC controller 210 determines that one DSRC zone 110 has priority over the other DSRC zone 112 based on the respective zone information. In other embodiments, DSRC controller 210 updates 530 the communication protocol based on the most restrictive of DSRC zones 110 and 112. In still other embodiments, DSRC controller 210 updates 530 the communication profile to align with both of DSRC zones 110 and 112, where the communication restrictions do not overlap. For example, DSRC zone 110 dictates only messages of a certain type and DSRC zone 112 dictates only messages of a certain size or less.

Figure 6:
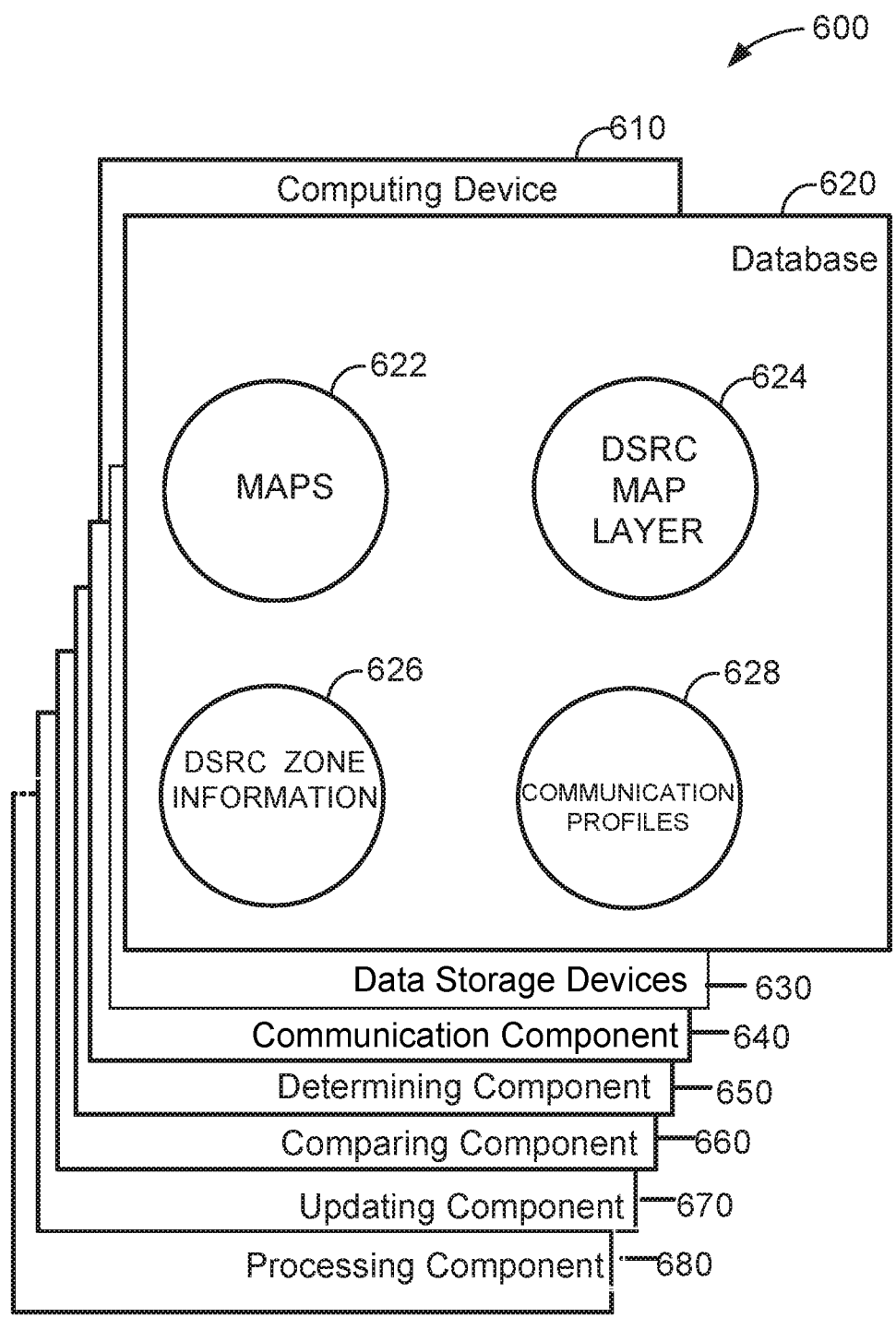

FIG. 6 is a diagram 600 of components of one or more example computing devices that may be used in DSRC system 200 (shown in FIG. 2). In some embodiments, computing device 610 is similar to DSRC controller 210 (shown in FIG. 2). Database 620 may be coupled with several separate components within computing device 610, which perform specific tasks. In this embodiment, database 620 includes maps 622, which may be similar to maps 102 (shown in FIG. 1A), DSRC zone layers 624, which may be similar to DSRC map layers 122 (shown in FIG. 1B), DSRC zone information 626, and communication profiles 628. In some embodiments, database 620 is similar to database 220 (shown in FIG. 2).

Computing device 610 includes database 620, as well as data storage devices 630. Computing device 610 also includes a communication component 640 for receiving 510 DSRC zone information (shown in FIG. 5). Computing device 610 also includes a determining component 650 for determining 515 a currently location of the DSRC device and determining 525 whether the DSRC device is within a DSRC zone (both shown in FIG. 5). Computing device 610 further includes a comparing component 660 for comparing 520 the current location to the DSRC zone information (shown in FIG. 5). In addition, computing device 610 includes an updating component 670 for updating 530 the communication profile (shown in FIG. 5). A processing component 680 assists with execution of computer-executable instructions associated with the system.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal languages of the claims.

What is claimed is:

1. A DSRC controller used for controlling a dedicated short-range communication (DSRC) device, said DSRC controller comprising a processor communicatively coupled to a memory device, said processor programmed to:
    store a communication profile of the DSRC device, wherein the communication profile includes rules for transmitting and receiving electronic communications by the DSRC device;
    receive DSRC zone information describing a DSRC zone;
    determine a current location of the DSRC device;
    compare the current location to the DSRC zone information;
    determine whether the DSRC device is located within a DSRC zone based on the comparison; and
    if the determination is that the DSRC device is located within the DSRC zone, update the communication profile of the DSRC device to turn off transmission of electronic messages within the DSRC zone by the DSRC device.

2. A DSRC controller in accordance with claim 1, wherein said processor is further programmed to:
    store a plurality of map information including a DSRC layer, wherein the DSRC layer includes one or more DSRC zones; and
    add the received DSRC information to the DSRC layer.

3. A DSRC controller in accordance with claim 2, wherein said processor is further programmed to compare the current location to the DSRC layer to determine whether the current location is within a DSRC zone included in the DSRC layer.

4. A DSRC controller in accordance with claim 1, wherein the DSRC zone information includes at least a location and a type for the DSRC zone.

5. A DSRC controller in accordance with claim 1, wherein the DSRC zone information describes a temporary DSRC zone.

6. A DSRC controller in accordance with claim 5, wherein said processor is further programmed to:
    receive a message indicating the temporary DSRC zone has ended; and
    update the communication profile to remove the DSRC zone information.

7. A DSRC controller in accordance with claim 1, wherein said processor is further programmed to determine the current location of the DSRC device based on at least one of location information from a global positioning system (GPS) device and location information from a Wi-Fi positioning system.

8. A DSRC controller in accordance with claim 1, wherein said processor is further programmed to determine if the current location is within a predetermined distance from the DSRC zone based on the DSRC zone information.

9. A DSRC controller in accordance with claim 1, wherein said processor is further programmed to:
    determine an updated current location for the DSRC device at a subsequent time;
    determine that the DSRC device is not located within the DSRC zone based on the updated current location and the DSRC zone information; and
    update the communication profile to remove the DSRC zone information.

10. A DSRC controller in accordance with claim 1, wherein said processor is further programmed to update the communication profile to activate an information download mode.

11. A computer-based method for controlling a dedicated short-range communications (DSRC) device, said method implemented using a DSRC controller in communication with a memory, said method comprising:
    storing, in the memory a communication profile of the DSRC device, wherein the communication profile includes rules for transmitting and receiving electronic communications by the DSRC device;
    receiving, at the DSRC controller, DSRC zone information describing a DSRC zone;
    determining, by the DSRC controller, a current location of the DSRC device;
    comparing, by the DSRC controller, the current location to the DSRC zone information;
    determining, by the DSRC controller, whether the DSRC device is located within a DSRC zone based on the comparison; and
    if the determination is that the DSRC device is located within the DSRC zone, updating the communication profile of the DSRC device to modify how the DSRC device transmits and receives electronic messages based on the DSRC zone information;
    determining an updated current location for the DSRC device at a subsequent time;
    determining that the DSRC device is not located within the DSRC zone based on the updated current location and the DSRC zone information; and
    updating the communication profile to remove the DSRC zone information.

12. A method in accordance with claim 11 further comprising:
    storing a plurality of map information including a DSRC layer, wherein the DSRC layer includes one or more DSRC zones; and
    adding the received DSRC information to the DSRC layer.

13. A method in accordance with claim 12 further comprising comparing the current location to the DSRC layer to determine whether the current location is within a DSRC zone included in the DSRC layer.

14. A method in accordance with claim 11, wherein the DSRC zone information describes a temporary DSRC zone, and wherein the method further comprises:
    receiving a message indicating the temporary DSRC zone has ended; and
    updating the communication profile to remove the DSRC zone information.

15. A non-transitory computer-readable storage device having processor-executable instructions embodied thereon, for controlling a dedicated short-range communications (DSRC) device, wherein when executed by a DSRC controller communicatively coupled to a memory, the processor-executable instructions cause the DSRC controller to:
    store a communication profile of the DSRC device, wherein the communication profile includes rules for transmitting and receiving electronic communications by the DSRC device;
    receive DSRC zone information describing a DSRC zone;
    determine a current location of the DSRC device;
    compare the current location to the DSRC zone information;
    determine whether the DSRC device is located within a DSRC zone based on the comparison; and if the determination is the DSRC device is located within the DSRC zone, update the communication profile of the DSRC device to turn off transmission of electronic messages within the DSRC zone by the DSRC device.

16. The computer readable storage device of claim 15, wherein the processor-executable instructions cause the DSRC controller to:
store a plurality of map information including a DSRC layer, wherein the DSRC layer includes one or more DSRC zones; and
add the received DSRC information to the DSRC layer.

17. The computer readable storage device of claim 16, wherein the processor-executable instructions cause the DSRC controller to compare the current location to the DSRC layer to determine whether the current location is within a DSRC zone included in the DSRC layer.

18. A DSRC controller used for controlling a dedicated short-range communication (DSRC) device, said DSRC controller comprising a processor communicatively coupled to a memory device, said processor programmed to:
store a communication profile of the DSRC device, wherein the communication profile includes rules for transmitting and receiving electronic communications by the DSRC device;
receive DSRC zone information describing a temporary DSRC zone;
determine a current location of the DSRC device;
compare the current location to the DSRC zone information;
determine whether the DSRC device is located within a DSRC zone based on the comparison;
if the determination is that the DSRC device is located within the DSRC zone, update the communication profile of the DSRC device to modify how the DSRC device transmits and receives electronic messages based on the DSRC zone information;
receive a message indicating the temporary DSRC zone has ended; and
update the communication profile to remove the DSRC zone information.

19. A computer-based method for controlling a dedicated short-range communications (DSRC) device, said method implemented using a DSRC controller in communication with a memory, said method comprising:
storing, in the memory a communication profile of the DSRC device, wherein the communication profile includes rules for transmitting and receiving electronic communications by the DSRC device;
receiving, at the DSRC controller, DSRC zone information describing a temporary DSRC zone;
determining, by the DSRC controller, a current location of the DSRC device;
comparing, by the DSRC controller, the current location to the DSRC zone information;
determining, by the DSRC controller, whether the DSRC device is located within a DSRC zone based on the comparison;
if the determination is that the DSRC device is located within the DSRC zone, updating the communication profile of the DSRC device to modify how the DSRC device transmits and receives electronic messages based on the DSRC zone information;
receiving a message indicating the temporary DSRC zone has ended; and
updating the communication profile to remove the DSRC zone information.

\* \* \* \* \*